United States Patent [19]
Hyde et al.

[11] Patent Number: 5,558,186
[45] Date of Patent: Sep. 24, 1996

[54] FRICTION DISK WITH RENEWABLE WEAR FACES

[75] Inventors: Robert W. Hyde, Beavercreek; William T. Holzworth, Springfield; Bradley J. Baden, Troy, all of Ohio

[73] Assignee: The BFGoodrich Company, Akron, Ohio

[21] Appl. No.: 449,437

[22] Filed: May 24, 1995

[51] Int. Cl.$^6$ .................................................. F16D 65/10
[52] U.S. Cl. ................................ 188/218 XL; 188/71.5; 188/250 D
[58] Field of Search .................... 188/71.5, 71.4, 188/250 R, 250 H, 250 C, 250 D–250 G, 250 B, 234, 238, 242, 243, 257, 258, 218 XL, 264 G, 240, 18 A

[56] References Cited

U.S. PATENT DOCUMENTS

| | | | |
|---|---|---|---|
| 3,708,042 | 1/1973 | Krause et al. | 188/218 XL X |
| 3,913,716 | 10/1975 | Sedlock | 188/218 XL X |
| 3,920,108 | 11/1975 | Ely | 188/218 XL X |

FOREIGN PATENT DOCUMENTS

| | | | |
|---|---|---|---|
| 2106290 | 9/1971 | Germany | 188/218 XL |
| 2524803 | 12/1975 | Germany | 188/218 XL |
| 211031 | 12/1983 | Japan | 188/264 G |
| 343235 | 1/1960 | Sweden | 188/218 XL |
| 2151729 | 7/1985 | United Kingdom | 188/218 XL |
| 2148187 | 3/1987 | United Kingdom. | |

OTHER PUBLICATIONS

Fitzgerald et al., The Economic and Safety Aspects of Commercial Aircraft Carbon Brakes, Apr. 18–21 Apr. 18, 1982.

*Primary Examiner*—Robert J. Oberleitner
*Assistant Examiner*—Peter M. Poon
*Attorney, Agent, or Firm*—David M. Ronyak

[57] ABSTRACT

A friction disk assembly comprises an annular structural carrier including a plurality of recessed regions and torque drive notches spaced around its circumferential direction, and a friction lining mounted on the carrier, the friction lining having a flat wear (rubbing) face and an obverse face including raised areas corresponding to and matingly engaging the recessed regions of the carrier to prevent rotation of the lining relative to the carrier. The carrier may be formed of steel or other suitable structural material. The lining may be formed of virgin or recycled carbon, ceramic or other suitable friction material. The lining may be retained to the carrier by rivets. The lining may be provided with a structural casing configured to engage the recessed regions of the carrier. The assembly may be refurbished by simple replacement of the worn lining. The carrier and the lining may be formed as unitary annular members or as segments of annular members.

25 Claims, 10 Drawing Sheets

FRICTION DISK WITH RENEWABLE WEAR FACES

BACKGROUND OF THE INVENTION

This invention relates to friction brake assemblies, particularly of the type having axially aligned alternating rotatable and stationary brake disks carried between and axially movable between a pressure plate and a reaction plate, and more particularly to an improved friction disk for use in such an assembly, suitable, for use in the brake stack of an aircraft wheel and brake assembly.

Carbon brake disks have come to be employed in many aircraft braking applications. The carbon material of which these disks are formed is very costly to manufacture. Such carbon or graphite disks have been commonly discarded when the friction surfaces of the disk are sufficiently worn. Many techniques have been proposed to maximize utilization of this expensive carbon material. Such prior art efforts include replacement of a single full thickness disk with two disks of reduced thickness (Article entitled "*The Economic and Safety Aspects of Commercial Carbon Brakes*", Apr. 18–21, 1982 by L. FitzGerald and B. Lockwood-Goose), riveting carbon wear plates to a structural carbon or graphite core disk (U.S. Pat. Nos. 3,712,427 and 3,800,392 and to Cook et al.), riveting carbon wear facings to a core disk formed of beryllium segments (U.S. Pat. No. 3,731,769 to Ely), bonding new friction facings to the carbon core of a used disk (GB 2148187B), and splitting two worn disks to form two thinner half disks and bonding one of them to each side of a carbon core to form a new disk (U.S. Pat. No. 4,982,818 to Pigford). Notwithstanding the foregoing efforts, there remains a desire to enhance carbon utilization.

The present invention provides a friction disk in which the wear surface(s) of the disk is/are mechanically attached to the associated carrier and may be renewed by replacement, and the structural core carrier can be reused, and a method for refurbishing such friction disk. The carrier includes an annular strap with a plurality of legs extending radially therefrom thereby forming a plurality of circumferentially spaced apart recesses. The obverse face of the lining (obverse to the friction face) includes raised areas of a shape that is complementary to the shape of the recesses of the carrier. The raised areas of the lining matingly engage the walls of the recesses of the carrier thereby locating the lining and providing a large bearing surface for transfer of torque during a braking action, thereby preventing rotation of the lining relative to the carrier. The forces generated during a braking action are transmitted from the lining to the core through shear loading of a large area of the the lining material compared to prior art methods. In these preferred embodiments, the braking forces are are not transferred through the fasteners which retain the lining in position on the core. The carrier may be formed of metal, carbon or other material capable of retaining sufficient structural properties at the temperatures to be encountered in service. The lining material may be formed from carbon friction material remaining after any use of any of the foregoing prior art methods or from virgin carbon or ceramic material.

In comparison to conventional steel aircraft brakes, preferred embodiments of disk assemblies according to the invention have increased resistance to bending or deformation from the desired flat configuration during a high energy braking action such may occur during a rejected takeoff of an aircraft. This increased resistance to bending from the desired flat configuration contributes to maintenance of a more uniform clamp load distribution across the full face of the brake stack or heat sink and structural integrity of the brake stack or heat sink during such high energy braking action.

SUMMARY OF THE INVENTION

An aircraft wheel brake assembly has an improved brake stack wherein the brake stack has a plurality of interleaved stator and rotor friction disks formed of a structural core carrier and mechanically attached friction linings, in which the forces generated during a braking action are primarily transmitted from the lining to the core separately from the fasteners which hold the lining to the core.

For a more complete understanding of the invention and its advantages, reference should be had to the following detailed description and the accompanying drawings in which there is shown and described a preferred embodiment of the invention.

DETAILED DESCRIPTION

Figure 1:
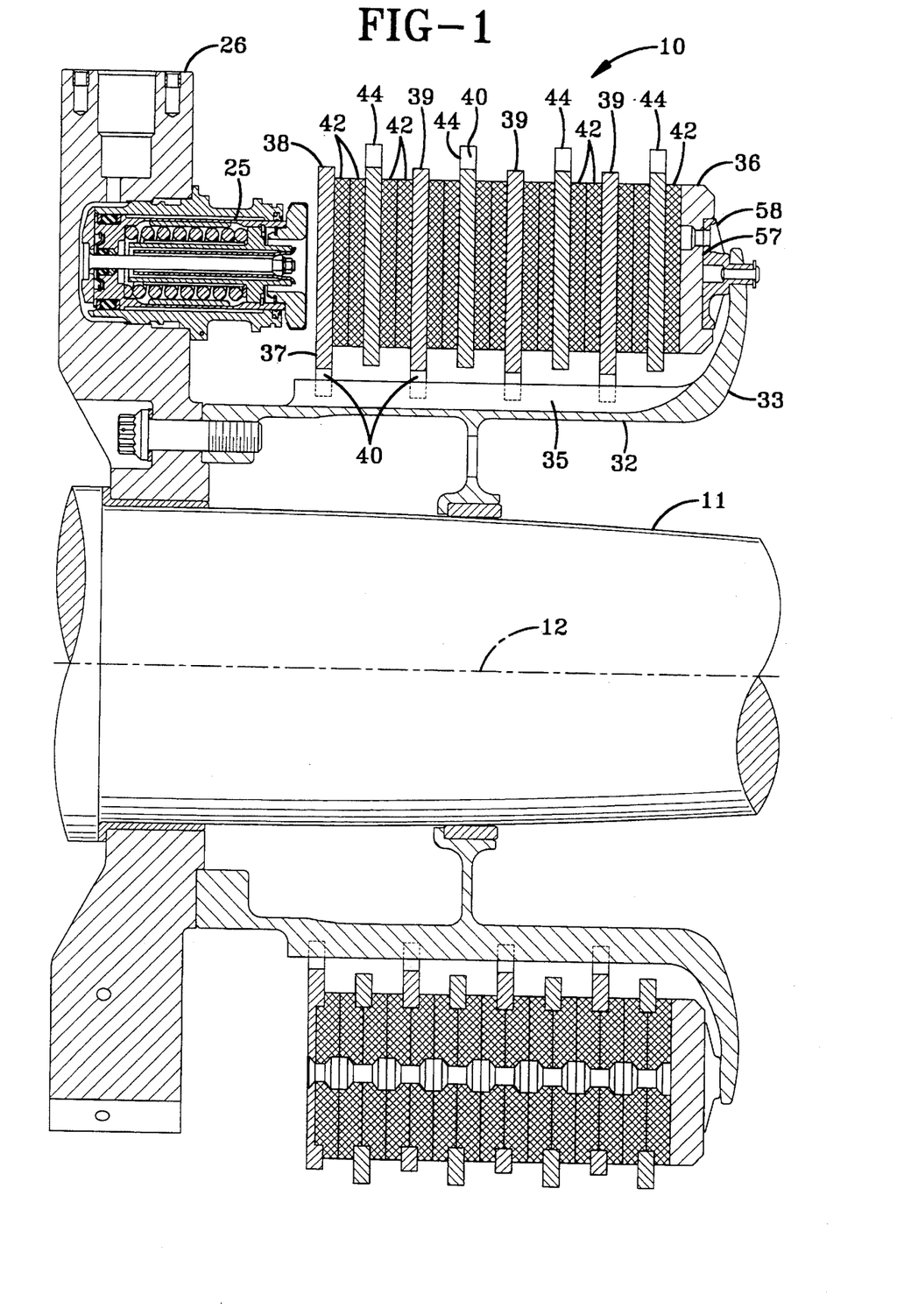
FIG. 1 is a schematic cross-sectional view of an aircraft brake assembly showing a piston housing with an actuating cylinder, pressure plate, torque tube and brake stack.

Referring to the drawings, wherein like reference numerals designate like or corresponding parts throughout the several views, there is shown in FIG. 1 a friction brake mechanism 10 mounted on axle 11 for use with a cylindrical wheel (not illustrated) rotatable about axial centerline 12 in a manner fully described in U.S. Pat. Nos. 4,018,082 to Rastogi et al., 4,878,563 to Baden et al., and 5,248,013 to Hogue et al. The friction brake mechanism 10 includes a pressure plate 38 adjacent the hydraulic piston motor 25, an end plate 36 distal from the piston motor, and a plurality of interleaved rotor disks 44 and stator disks 39 which together form the brake heat sink or brake stack. The friction brake mechanism 10 also includes a torque tube 32 to which the pressure plate 38, end plate 36 and stator disks 39 are slidably mounted against rotation relative to the wheel and rotor disks 44.

The reaction plate 33 may be made integral with the torque tube 32 as shown in FIG. 1 or may be made as a separate annular piece and suitably connected to the stationary torque tube 32. Torque tube 32 has a plurality of circumferentially spaced splines 35 that are axially extending. Splines 35 on torque tube 32 support an axially moveable nonrotatable pressure plate 38 and axially moveable nonrotatable stator disks 39. All of such stator disks 39 and pressure plate 38 have notches in the form of slotted openings at circumferentially spaced locations on their inner periphery for captive engagement by the spline members 35 as is old and well known in the art. The respective annular stator disks 39 each have friction linings secured to opposite faces thereof as shown in FIG. 1. Pressure plate 38 also has a friction lining 42 on one surface thereof to act in concert with the other friction linings 42 when a braking action occurs. An end plate 36 carrying an annular friction lining 42 is suitably connected to the flared end 33 of the torque tube 32 and acts in concert with the stator disks 39 and the pressure plate 38 to be further described herein.

A plurality of axially spaced rotor disks 44 interleaved between the pressure plate 38 and the stator disks 39, have a plurality of circumferentially spaced notches 40 along their outer periphery for engagement by corresponding ribs secured to the inner periphery of the wheel. The annular rotor disks 44 are each formed of an annular carrier 45 having mechanically attached friction linings 42 to be further described herein.

Such stator disks 39 with their friction linings 42 and rotor disks 44 with their friction linings 42 acting together during a braking action provide a heat sink. The number and size of the disks may be varied as is necessary for the application involved. The circumferentially spaced notches 40 on the inner periphery of the stator disk carriers 41 and on the outer periphery of the rotor disk carriers 45 may accommodate reinforcing inserts to provide reinforcement to the walls of such slotted openings and to enhance the life of such slots. Such reinforcing are also referred to as drive clips.

The actuating mechanism for the brake includes a plurality of hydraulic piston assemblies 25 circumferentially spaced around the annular piston housing 26 in known manner. Only one piston assembly is shown in FIG. 1. Upon actuation by fluid pressure, the piston motors effect a braking action by moving the pressure plate 38 and the stator disks 39 into frictional engagement with the rotor disks 44 and against the reaction plate 33.

The pressure plate 38 has an annular friction lining 42 of carbon composite material attached as by rivets 48 to the surface of pressure plate 38 opposite to the face of the pressure plate carrier 37 that receives the head of the hydraulic piston motors 25. The carrier 37 of pressure plate 38 is engaged to the torque tube 32 via slotted opening at circumferentially spaced locations on its inner periphery. The carbon friction lining 42 is riveted to the pressure plate carrier 37 to locate the lining in position, but transfer of the braking forces, e.g. torque, from lining to carrier is through contact of the raised areas 43 of the lining with recessed regions 34 formed in the pressure plate carrier 37.

The carbon friction lining 42 contributes to stiffness of the pressure plate, stator disks, rotor disks and reaction plate and thereby enhances the uniformity of clamp load during high energy stops. The carbon friction lining is typically high-strength, stiff, low-density annular member that can maintain its stiffness at extremely high temperatures such as 2000° F. With the use of the carbon-lined steel carrier disks, there is a more uniform distribution of the clamp load across the faces of the brake linings in the heat stack (stators, rotors, pressure plate and end plate) in comparison to a conventional steel brake.

Figure 2:
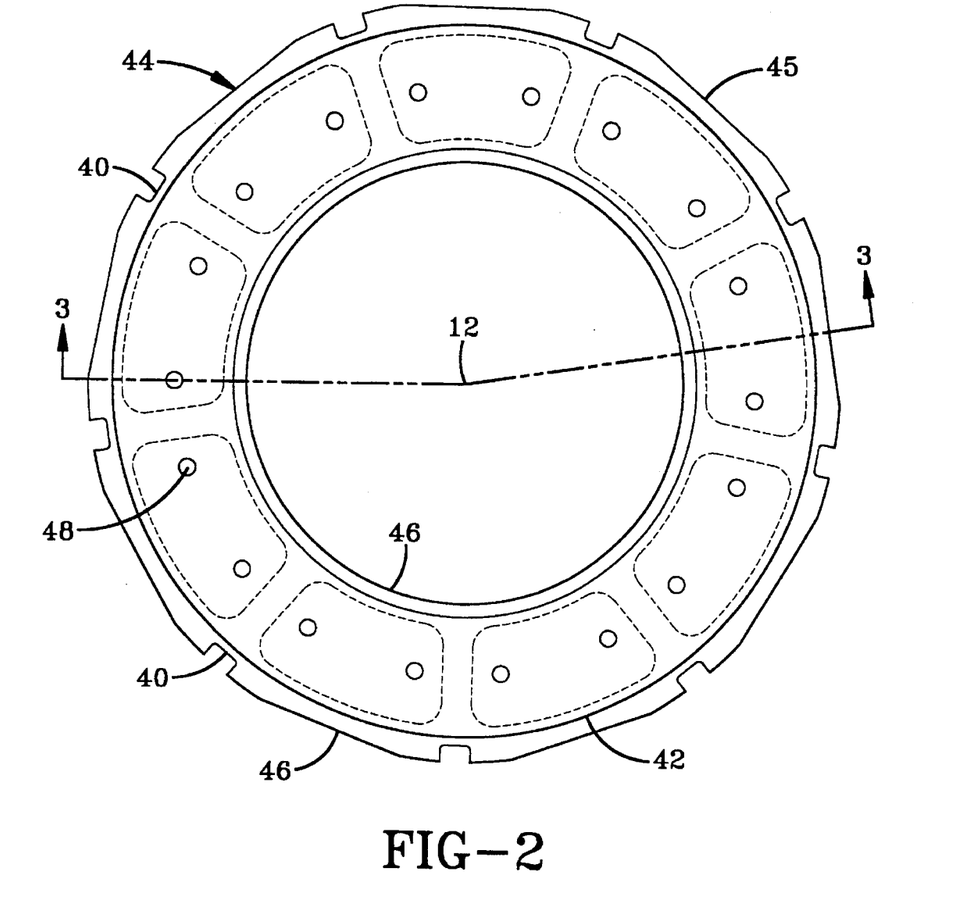
FIG. 2 is a plan view of a friction disk (rotor) according to the invention.
Figure 3:
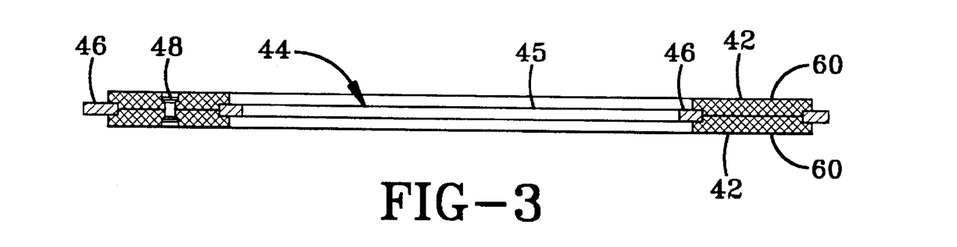
FIG. 3 is a sectional view taken along line 3—3 of FIG. 2.

Having reference to FIGS. 1 through 3, reference numeral 44 designates generally a friction disk that is provided at spaced intervals on its outer periphery with a plurality of notches 40. Notches 40 receive the drive keys of a rotatable wheel assembly so that the rotor disks 44 are rotated with the wheel while being capable of axial movement relative to the wheel. Friction rotor disk 44 includes an annular carrier 45 and friction linings 42 secured thereto by mechanical fasteners such as rivets 48.

Figure 4:
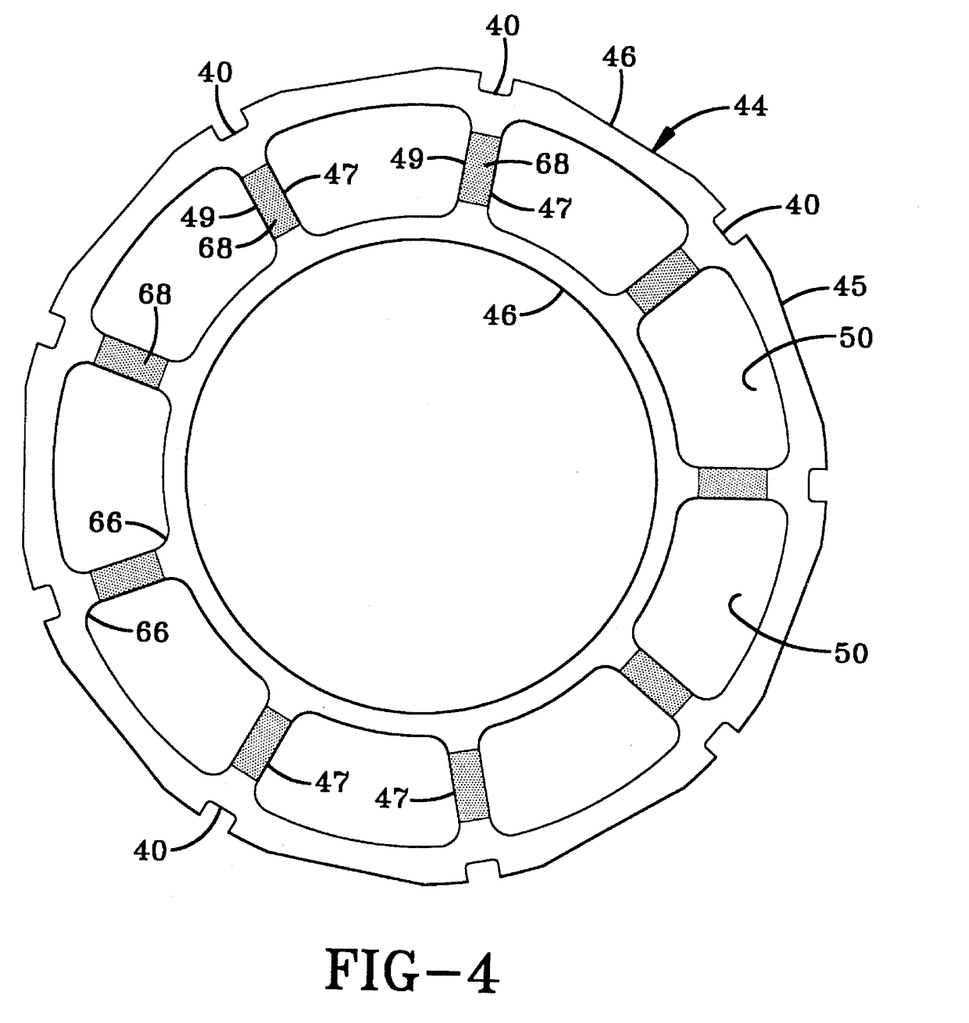
FIG. 4 is a plan view of the carrier of the friction disk of FIG. 2.
Figure 5:
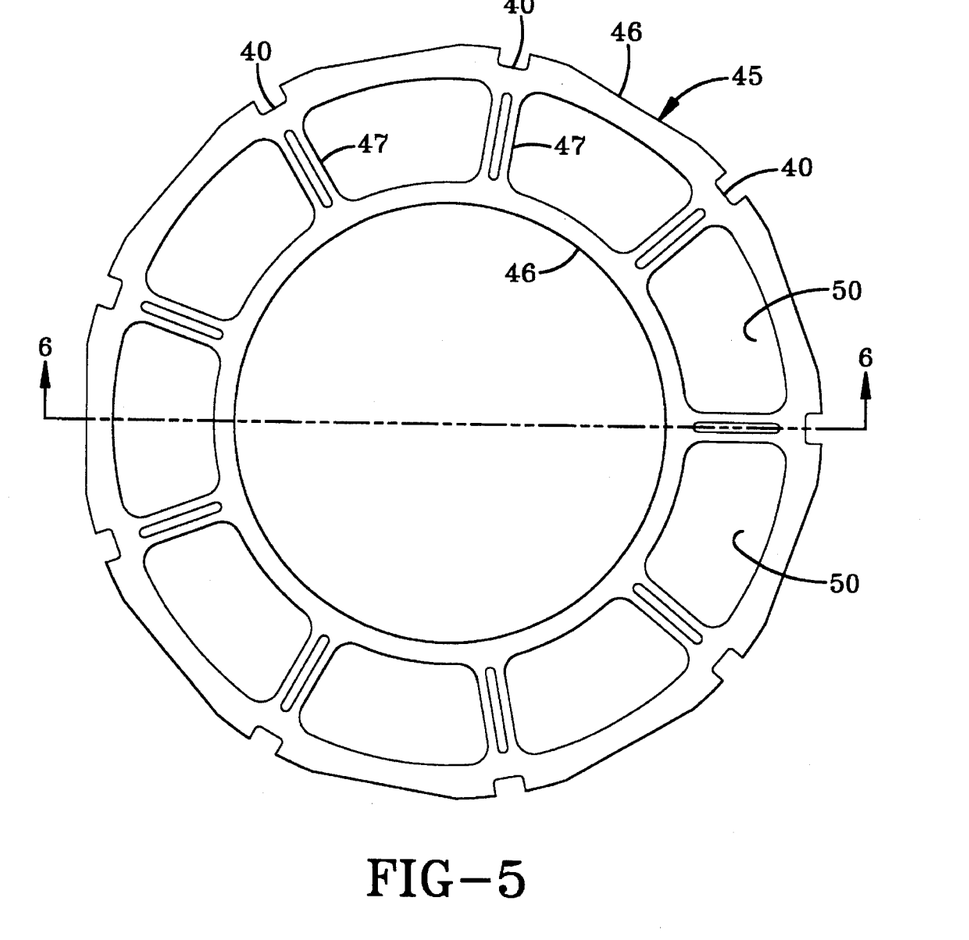
FIG. 5 is a plan view of an alternate embodiment of a friction disk carrier (rotor) according to the invention.

The carrier 45 of friction rotor disk 44 is preferably formed of a material chosen for its structural properties, such as type 1722 steel available from The Timken Company, other metal or carbon composite. As shown in FIGS. 4 and 5, the carrier 45 of a rotor disk 44 includes a circumferentially extending strap 46 provided at circumferentially spaced intervals with radially extending legs 47. In the particular embodiments shown in FIGS. 2 through 4, the carrier 45 includes a pair of concentric circumferentially extending straps 46, one defining its outer periphery, the other defining its inner periphery, with a plurality of legs 47 extending radially therebetween and joining the inner and outer straps, thereby defining a plurality of recessed regions in the form of windows 50 devoid of any material. The junctions 66 of the radially extending legs 47 with the circumferentially extending straps 46 preferably are generously radiused to minimize thermally induced stresses; this also provides bearing area for transfer of forces between the friction lining 42 and the carrier 45. The carrier is preferably formed as a single unitary member, e.g. by cutting from a sheet or flat plate of material or by molding or casting. Alternatively, the carrier may be formed of segments that are mechanically joined together, e.g. in the manner shown in any of U.S. Pat. Nos. 3,731,769 to Ely, 3,550,740 to LeBlanc et al. and 4,747,473 to Bok et al. Carriers for all rotor disks and stator disks may be cut or machined from flat plate of the chosen material. Casting is efficient for production of carriers having a complex shape including areas of reduced thickness.

Figure 9:
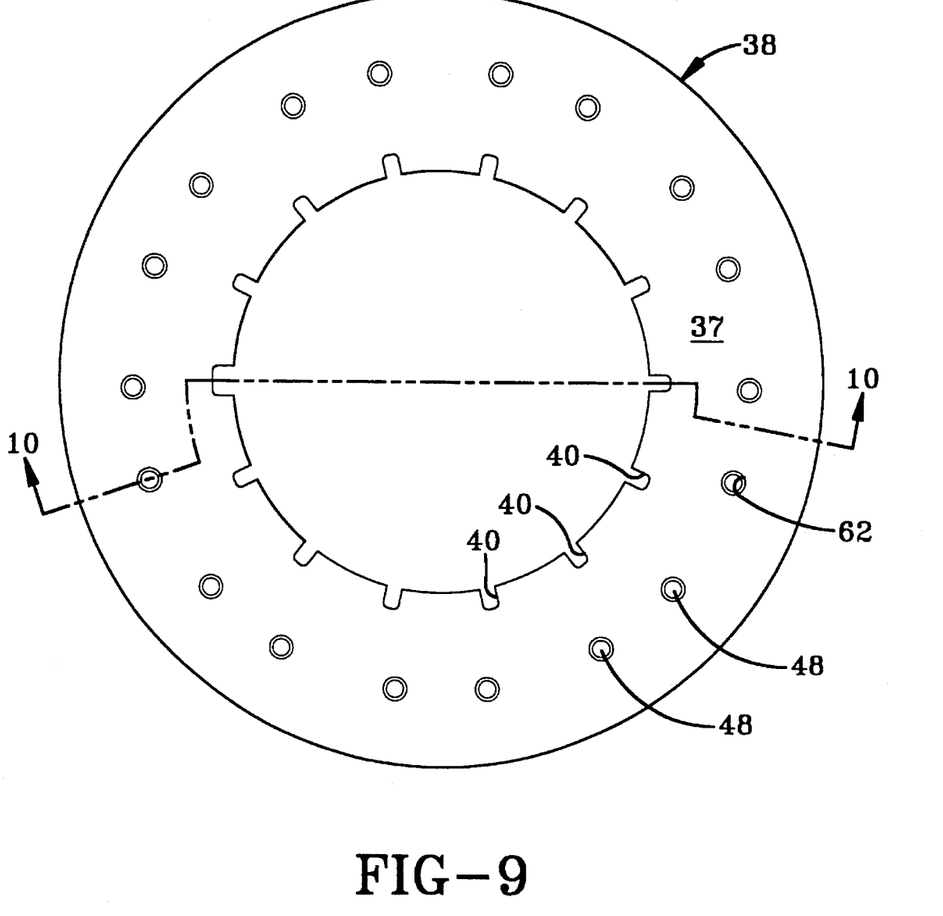
FIG. 9 is a plan view of a friction disk (pressure plate) according to the invention.
Figure 10:
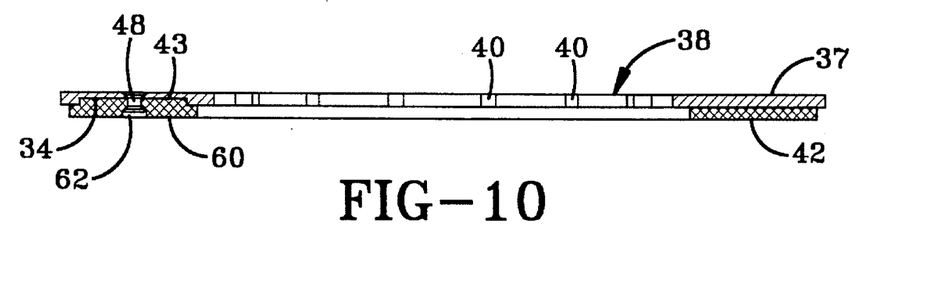
FIG. 10 is a sectional view taken along line 10—10 of FIG. 9.

As illustrated in FIGS. 9 and 10, when the carrier 37 is intended for use as a pressure plate 38 or end plate 36, recessed regions 34 are preferably formed without cutting completely through the thickness of the carrier. As shown in FIG. 1, when the carrier is intended for mounting on the reaction end 33 of the torque tube 32, additional recesses 57 may be formed in the face directed away from the piston motors 25 for engagement with the torque transfer buttons 58 secured to the flared reaction end 33 of the torque tube 32.

Figure 15:
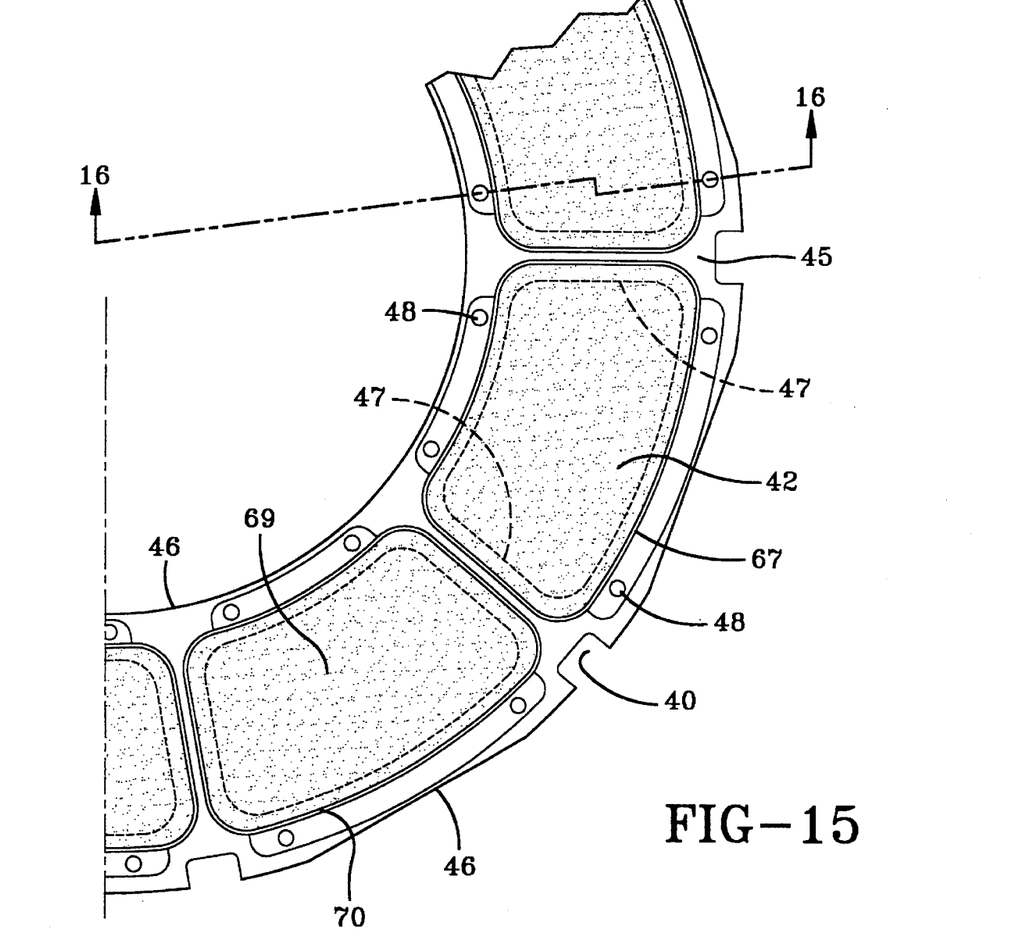
FIG. 15 is a fragmentary plan view of an alternate embodiment of a friction disk (rotor) according to the invention.
Figure 16:
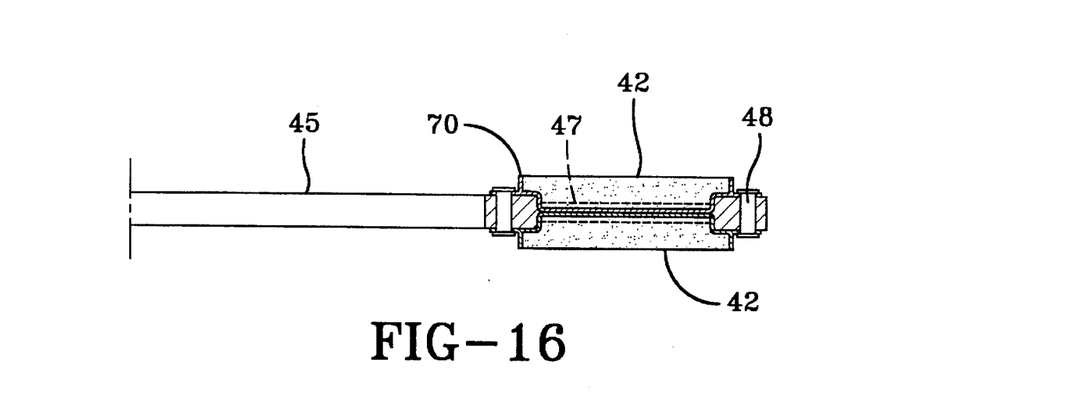
FIG. 16 is a sectional view taken along line 16—16 of FIG. 15.

The friction lining 42 may be formed of any suitable material chosen primarily for its frictional, wear resistance and heat capacity properties, and secondarily for its structural, corrosion and oxidation resistance properties. The friction lining 42 is preferably formed of material selected primarily for its tribological properties. The friction lining may be advantageously formed of carbon, graphite, ceramic or sintered metallic material. The friction lining is preferably in the form of an annular ring of a size corresponding to the carrier, but may be in the form of individual pads or sectors of an annular ring. Pads or sectors of currently available carbon material have been found to wear much faster than continuous annular friction members of the same material. Because the friction lining does not directly engage the drive keys of the wheel or splines of the torque tube, the friction lining need not have the structural strength required of conventional disks formed entirely of carbon material. As shown in FIGS. 1–3 and 7–12, each friction lining 42 has a flat annular wear face or rubbing face 60 adapted for engagement with the opposing wear face 60 of an adjacent friction lining 42. The obverse face of each friction lining 42 having a plurality of raised areas 43 corresponding in shape to the recessed regions 34 or window regions 50 of the carrier 37, 41, 45 with which the lining is designed to be used. The mating engagement of the periphery of the raised areas 43 with the recessed regions 34 or window regions 50 provides a large bearing surface for transfer of the forces generated during braking action, thereby preventing rotation of the friction lining 42 relative to the carrier 37, 41, 45, and locates the position of the friction lining 42 relative to the carrier 37, 41, 45. As shown in FIGS. 15 and 16, when the friction lining is formed of a non-structural material such as sintered metallic material, the friction lining may be provided on its obverse face with a structural casing 70, e.g. of steel, which is configured to matingly engage with the recessed regions 34 or window regions 50 of the associated carrier.

Figure 7:
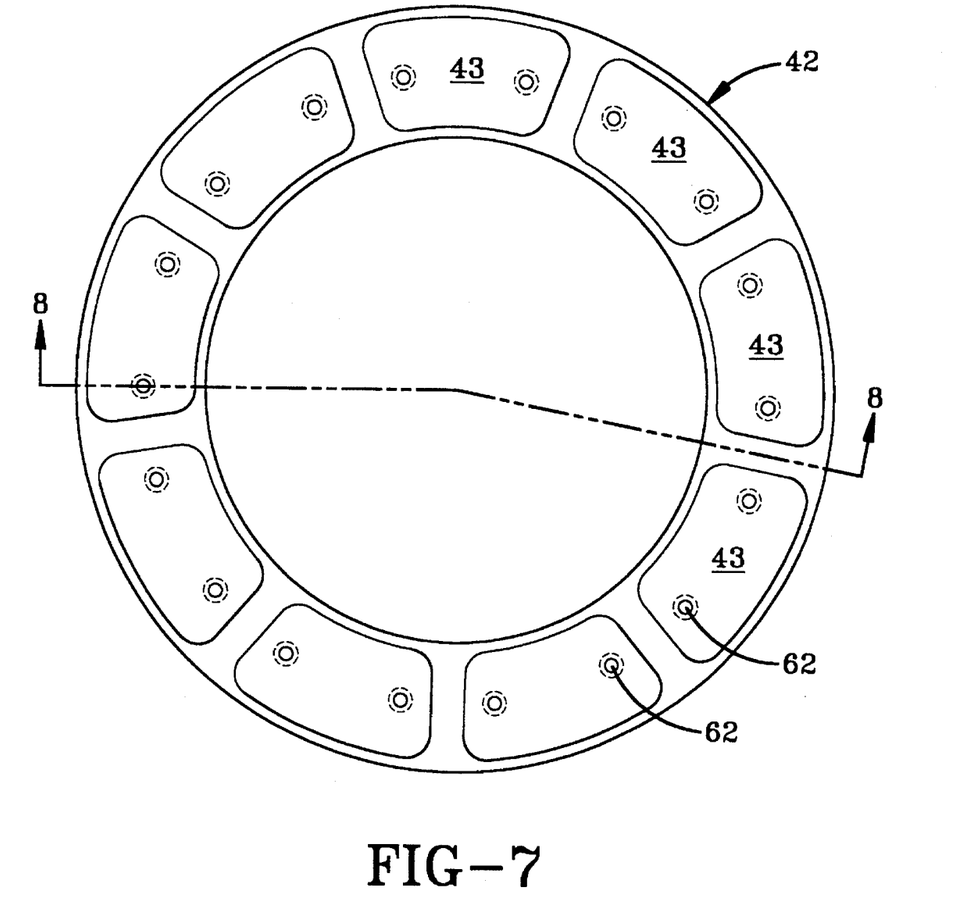
FIG. 7 is a plan view of a friction lining of the friction disk of FIG. 2.
Figure 8:
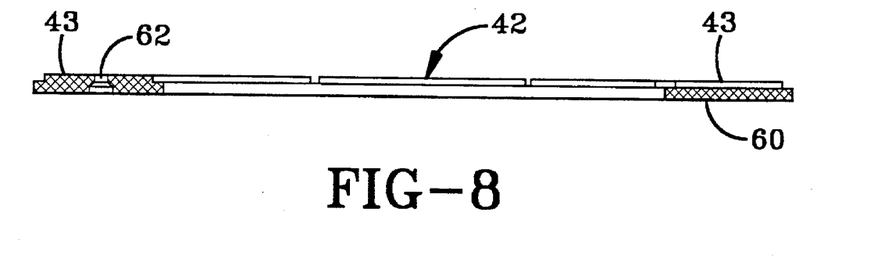
FIG. 8 is a sectional view taken along line 8—8 of FIG. 7.

As shown in FIGS. 7 and 8, the friction linings 42 of the pressure plate 38, end plate 36, stator disks 39 and rotor disks 44 may be and preferably are identical. The thickness of the raised areas 43 of each friction lining 42 may be the same as but is preferably slightly more than one half of the thickness of the carrier 37, 41, 45. Thus, when assembled to form a rotor disk 44 or stator disk 39 other than a pressure plate 38 or an end plate 36, the confronting faces of the raised areas 43 of friction linings 42 are in contact with and bear on each other rather than on the carrier 41, 45 both when mounted and as a clamping load is applied during a braking action. For a steel carrier having a thickness of about 0.30 inches, a nominal clearance of about 0.003 inches per side is provided when carbon friction linings are employed. Each friction lining 42 includes a plurality of apertures 62 extending therethrough in the thickness direction of the raised areas 43. Recessed rivets 48, preferably of type 304 stainless steel, secure the friction linings 42 to each other. Preferably, all rivets lie on a common circle when the friction linings are formed of carbon to minimize the formation of wear tracks on wear faces 60. Preferably, the, rivets 48 are not tensioned against the friction lining 42 when installed at ambient temperature and the length of the rivets 48 is at least equal to the thickness of the associated carrier, thereby ensuring that upon thermal cycling from ambient temperature the rivets will not be tensioned and cause cracking or distortion of the friction lining.

Figure 11:
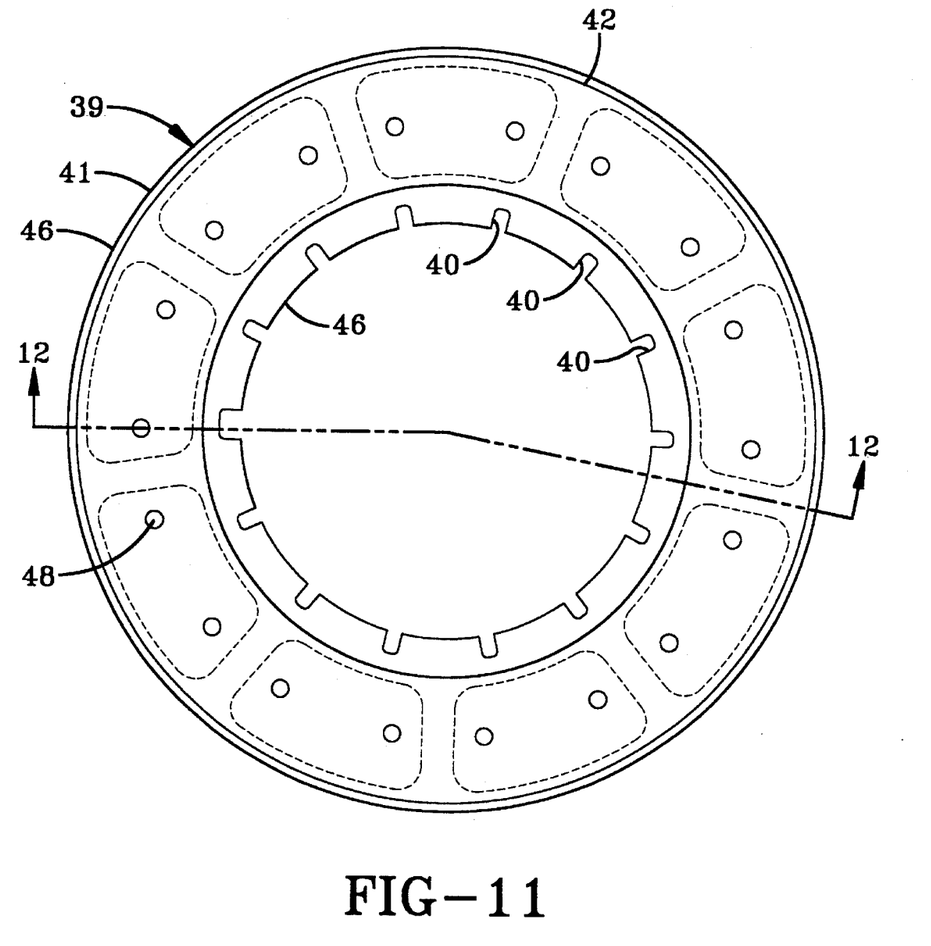
FIG. 11 is a plan view of a friction disk (stator) according to the invention.
Figure 12:
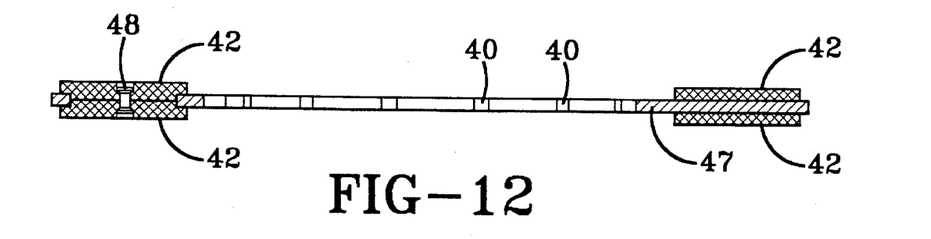
FIG. 12 is a sectional view taken along line 12—12 of FIG. 11.

It should be understood that while the construction of rotor disks 44 is described in detail above, the principles of the invention may be likewise advantageously employed in the construction of a stator disk 39 as shown in FIGS. 1 and 11. In the case of a stator disk 39, the drive notches 40 of the carrier 41 are formed on its inner circumference for engagement with the splines 35 of the torque tube 32 rather than on its outer periphery as in the case of a rotor disk 44.

As shown in FIGS. 9 and 10, the construction of pressure plate 38 is similar to that of rotor 44 and stator 39, except that the recessed regions 34 of carrier 37 are not cut all the way through the thickness of the carrier, and the carrier is provided with drive notches 40 around its inner periphery rather than its outer periphery. The friction lining 42 of the pressure plate 38 may be and preferably is identical to that of the rotor disks 44, and is secured to carrier 37 by rivets 48 passing through the raised areas 43 of the linings and recessed regions 34 of the carrier. The depth of the recessed regions 34 of carrier 37 is slightly less than the height of the raised areas 43 of the friction lining 42 to ensure that the raised areas of the friction lining bear on the bottom of the recessed regions. When the carrier 37 of pressure plate 38 is formed of type 1722 steel of about 0.30 inch thickness and the lining is formed of carbon, a thickness clearance of from zero to about 0.003 inch is provided.

The construction of the end plate 36 is dependent on the design of the reaction end of the torque tube 32. Where the design (not illustrated) of the torque tube provides a series of splines for engagement by corresponding notches formed on the inner periphery of the carrier of the end plate, the end plate 36 may be of a construction similar or identical to that of the pressure plate 38. Alternatively as illustrated in FIG. 1, where the torque tube 32 includes a flared reaction end 33 having a plurality of torque transfer buttons 58 secured thereto, the carrier 64 of the end plate 36 may be provided with a plurality of torque transfer recesses 57 for engagment with the plurality of torque transfer buttons 58. In either case, the friction lining 42 is secured to its carrier by a plurality of rivets 48 which pass through the regions of greatest thickness of the friction lining and recessed regions of the carrier.

Figure 13:
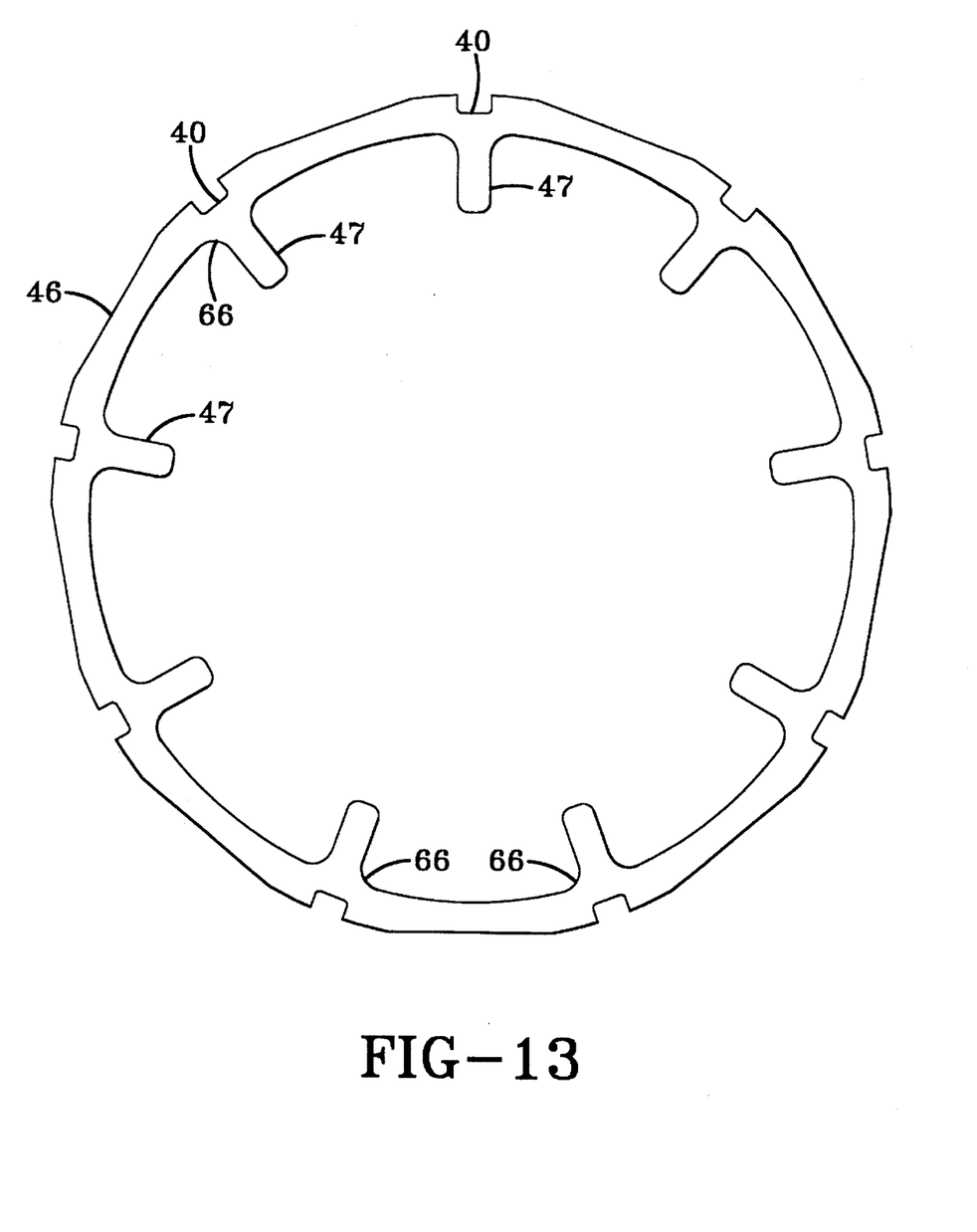
FIG. 13 is a plan view of an alternate embodiment of a friction disk carrier (rotor) according to the invention.
Figure 14:
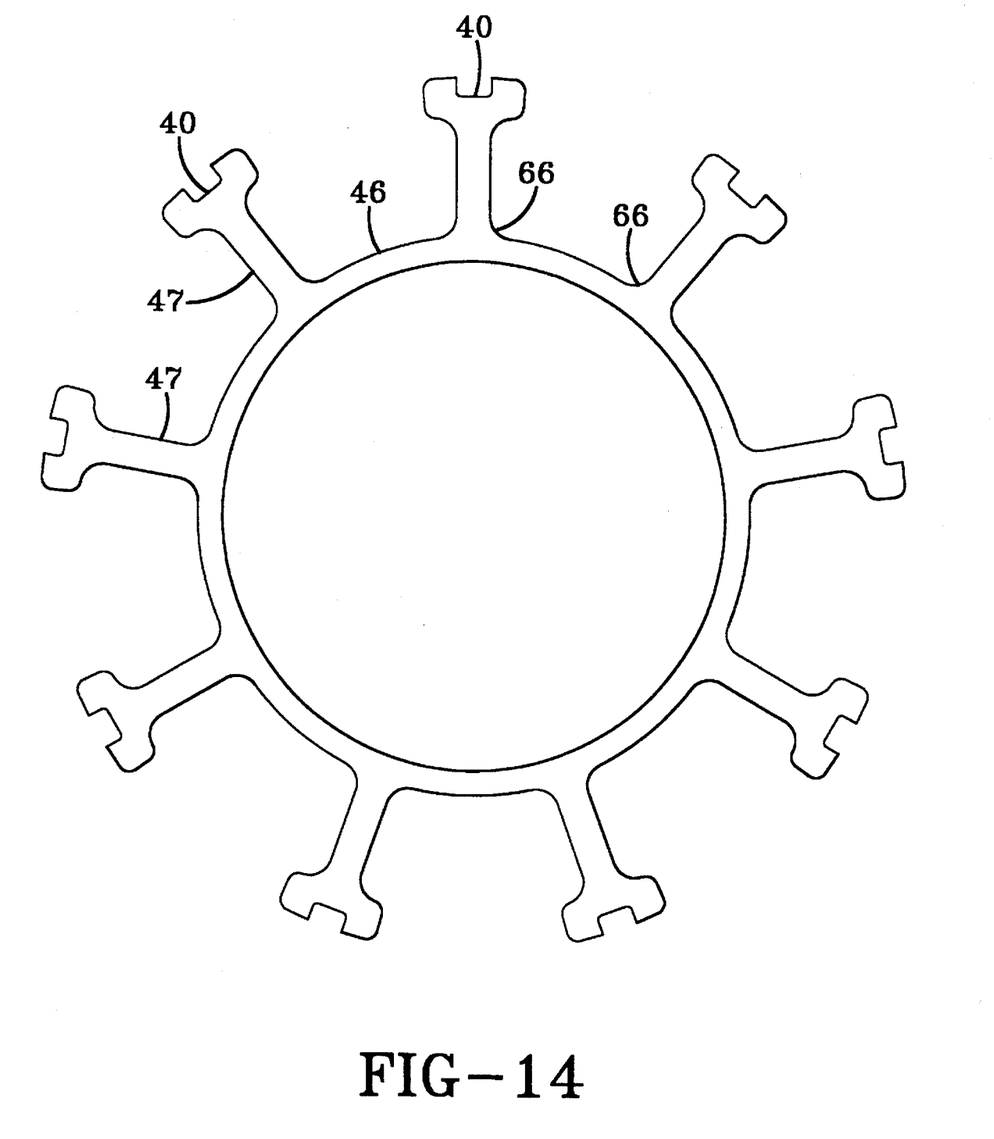
FIG. 14 is a plan view of an alternate embodiment of a friction disk carrier (rotor) according to the invention.

In FIG. 13, there is shown another embodiment of a carrier for a friction disk (rotor) according to the invention. The radial legs 47 extend radially inwardly less than the full radial extent of the associated friction lining (not illustrated). According to another embodiment of a carrier for a friction disk (rotor) shown in FIG. 14, most of the outer circumferentially extending strap is removed between adjacent radial legs 47. Similar alternate embodiments of carriers for stator disks are also possible and within the invention. These and other variations permit an increase in volume of the friction lining material and a decrease in volume of carrier material without increasing the overall size of the friction disk.

Figure 6:
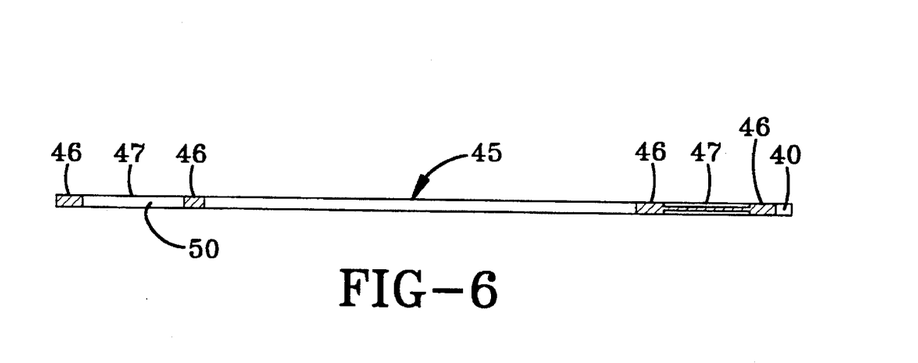
FIG. 6 is a sectional view taken along line 6—6 of FIG. 5.

In the embodiment of a friction disk carrier (for a rotor disk) shown in FIGS. 5 and 6, radial legs 47 are reduced in cross section between radially inner and radially outer straps 46 to form an I-beam, which is believed to reduce the thermally induced stresses in carrier 45 that would otherwise occur in service.

When the friction linings 42 have become sufficiently worn that they must be replaced, it is merely necessary to remove the rivets 48, discard the worn friction linings, position new friction linings on either side of the carrier and rivet the new friction linings into place. With exception of the pressure plate 38 and end plate 36, rivets preferably do not pass through apertures in the carrier. Thus, there is little risk of damage to the carriers 45 of the rotor disks 44 and carriers 41 of the stator disks 39 during refurbishment. Where the friction lining is provided with structural casing, apertures for mounting the lining may be formed in the casing outside of the rubbing or contacting area of the wear faces, e.g. radially outwardly or radially inwardly of the wear faces.

The thickness of the carriers at their drive notches 40 is comparable to those of conventional steel brakes to assure long life and the ability to be relined several times. As shown in FIGS. 15 and 16, the thickness of the radial legs 47 may be reduced relative to the thickness of the circumferential straps 46. This, too, is believed to reduce the thermally induced stresses in the carrier that would otherwise occur in service.

Also shown in FIGS. 15 and 16 is a friction lining 42 formed of segments 67 of sintered metallic material 69 that is provided on its obverse face with a structural casing 70, e.g. of steel, that is configured to matingly engage with the recessed regions 34 or window regions 50 of the associated carrier and to provide cups which support the sintered metallic material. Use of structural casing 70 permits location of the fasteners such as rivets 48 in the structural casing outside of the rubbing or contacting area of the wear faces, e.g. radially outwardly or radially inwardly of the wear faces, or in recessed regions between the circumferentially spaced segments 67 of sintered metallic material.

The thickness of a steel carrier for a carbon lined brake assembly suitable for use on a Boeing 737 aircraft is about 0.30 inches. The thickness of the friction linings for this same application when formed of carbon is about 0.44 inches in the raised areas, and about 0.29 inches elsewhere.

The carrier may be formed of any suitable material chosen primarily for its structural properties, and secondarily for its heat capacity. The carrier may advantageously formed of metal such as steel, beryllium, titanium or Inconel, or of carbon and/or ceramic composite material designed for structural strength and resistance to corrosion and oxidation. Beryllium carriers may be provided with drive notch reinforcement of a different material such as steel to eliminate beryllium dust. When the carriers are formed of structural material such as type 1722 steel or the like, there is no need to utilize costly drive clips. When the carrier is formed of steel, it is preferable that the obverse side of any carbon friction lining be treated against oxidative attack due to proximity or contact with the steel carrier; alternatively, the steel carrier may be plated to inhibit such oxidative attack. To enhance retention of carrier structure during high energy input conditions such as may be encountered during a rejected take-off of an aircraft, the carrier(s) may be coated with a refractory thermal barrier material, e.g. ceramic material. Preferably, only those portions of the carrier(s) needing protection against excessive temperature during such an emergency energy input are coated. These areas may be determined empirically. As shown in FIG. 4, the middle portions 49 of radial legs 47 of carrier 45 are provided with thermal barrier coating 68, to retard separation of radially outer circumferential strap 46 from the remainder of the carrier and its associated friction lining(s) during such a high energy input condition.

It would be apparent that, although a specific embodiment of the invention has been described in detail, the invention is not limited to such specifically illustrated and described construction since variations may be made without departing from the principles of the invention.

What is claimed is:

1. A friction disk comprising an annular carrier including a plurality of recessed regions and torque drive notches spaced around its circumferential direction, and a friction lining mounted on the carrier, the friction lining having a flat wear face and an obverse face including raised areas corresponding to and matingly engaging the walls of the recessed regions of the carrier to provide torque transfer capability between the lining and the carrier, the depth of the recessed regions being slightly less than the height of the raised areas.

2. The disk of claim 1 wherein the carrier includes a circumferentially extending strap having a plurality of legs extending radially therefrom and engaging the raised areas of the friction lining.

3. The disk of claim 2 wherein the strap is continuous and defines the radially outer periphery of the carrier and the legs extend radially inwardly therefrom, the torque drive notches spaced around the outer circumference of the strap.

4. The disk of claim 2 wherein the strap defines the radially inner periphery of the carrier and the legs extend radially outwardly therefrom, the torque drive notches spaced around the radially inner periphery of the strap.

5. The disk of claim 2 wherein the radial extent of the legs is less than that of the wear face of the friction lining.

6. The disk of claim 2 wherein at least one of the radially extending legs is of I-shaped cross-sectional configuration when viewed in a plane that is normal to the radial direction of the radially extending leg.

7. The disk of claim 1 wherein at least a portion of the carrier includes a thermal barrier coating.

8. The disk of claim 1 wherein the carrier is in the form of concentric radially inner and radially outer circumferentially extending straps joined by a plurality of legs extending radially therebetween defining recessed regions.

9. The disk of claim 1 wherein the friction lining includes apertures provided with mechanical fasteners that retain the friction lining on the carrier without tension against the friction lining.

10. The disk of claim 1 wherein the friction lining is provided on its obverse face with a structural casing configured to matingly engage the walls of the recessed regions of the carrier, the structural casing including apertures located outside of the wear face that are provided with mechanical fasteners that retain the friction lining on the carrier.

11. The disk of claim 1 in which the carrier is formed from metal and the friction lining is formed from carbon, graphite, ceramic or sintered metallic material.

12. A method of refurbishing a worn friction disk comprising an annular carrier including a plurality of recessed regions and torque drive notches spaced around its circumferential direction,, and a friction lining mounted on the carrier, the friction lining having a flat wear face and an obverse face including raised areas matingly engaging the walls of the recessed regions of the carrier to provide torque transfer capability between the lining and the carrier, the method comprising replacing the worn friction lining with new friction lining to provide a desired assembly thickness, the new friction lining having a flat wear face and an obverse face including raised areas matingly engaging the walls of the the recessed regions of the carrier to provide torque transfer capability between the lining and the carrier, the raised areas of the friction lining bearing the friction lining against a clamping load applied during a braking action.

13. The method of claim 12 further including securing the new friction lining by rivets without tensioning the rivets.

14. The method of claim 13 further including securing a pair of new friction linings on opposite sides of the carrier with the raised areas of one of the friction linings in contact with the raised areas of the other of the friction linings when mounted on the carrier, the raised areas of the pair of friction linings bearing the friction linings against a clamping load applied during a braking action.

15. The method of claim 14 wherein the carrier is formed of metal and at least one of the friction linings is formed of carbon and the thickness of the raised areas of each friction lining is slightly more than one half of the thickness of the carrier.

16. The method of claim 12 wherein the carrier includes a circumferentially extending strap having a plurality of legs extending radially therefrom to define the recessed regions of the carrier, the legs engaging the raised areas of the friction lining, the method further including providing a new friction lining of sintered metallic material provided on its obverse face with a structural casing configured to matingly engage the walls of the recessed regions of the carrier.

17. A friction disk comprising an annular carrier including a plurality of recessed regions extending completely through the thickness of the carrier to define a plurality of window regions and torque drive notches spaced around its circumferential direction, and a pair of friction linings mounted on opposite sides of the carrier, each of the friction linings having a flat wear face and an obverse face including raised areas corresponding to and matingly engaging the walls of the recessed regions of the carrier to provide torque transfer capability between the linings and the carrier, the raised areas of one of the pair of friction linings bearing on the raised areas of the other of the pair of friction linings when mounted on the carrier.

18. The disk of claim 17 wherein the carrier includes a circumferentially extending strap having a plurality of legs extending radially therefrom and engaging the walls of the raised areas of the friction linings.

19. The disk of claim 18 wherein the strap defines the radially outer periphery of the carrier and the legs extend radially inwardly therefrom, the strap including the plurality of torque drive notches spaced around its outer circumference.

20. The disk of claim 18 wherein the strap defines the radially inner periphery of the carrier and the legs extend radially outwardly therefrom, the strap including the plurality of torque drive notches spaced around its radially inner periphery.

21. The disk of claim 18 wherein the radial extent of the legs is less than that of the wear faces of the friction linings.

22. The disk of claim 18 wherein at least one of the radially extending legs is of I-shaped cross-sectional configuration when viewed in a plane that is normal to the radial direction of the radially extending leg.

23. The disk of claim 17 wherein a portion of the carrier includes a thermal barrier coating.

24. The disk of claim 17 wherein the carrier is in the form of concentric radially inner and radially outer circumferentially extending straps joined by a plurality of legs extending radially therebetween.

25. The disk of claim 17 wherein the carrier is formed from metal and each friction lining is a continuous annular member formed from carbon, graphite, ceramic or sintered metallic material.

* * * * *